(12) United States Patent
Cha

(10) Patent No.: US 9,555,852 B2
(45) Date of Patent: Jan. 31, 2017

(54) BICYCLE HAVING FRONT WHEEL DRIVING MEANS

(71) Applicants: SHINPYEONG INDUSTRIAL CO., LTD., Busan (KR); Jin-woo Cha, Busan (KR)

(72) Inventor: Jin-woo Cha, Busan (KR)

(73) Assignees: SHINPYEONG INDUSTRIAL CO., LTD (KR); Jin-Woo Cha (KR)

( * ) Notice: Subject to any disclaimer, the term of this patent is extended or adjusted under 35 U.S.C. 154(b) by 0 days.

(21) Appl. No.: 15/047,899

(22) Filed: Feb. 19, 2016

(65) Prior Publication Data

US 2016/0167728 A1    Jun. 16, 2016

Related U.S. Application Data

(63) Continuation of application No. PCT/KR2014/005387, filed on Jun. 19, 2014.

(30) Foreign Application Priority Data

Aug. 26, 2013 (KR) .................. 10-2013-0100926

(51) Int. Cl.
| | |
|---|---|
| *B62K 21/00* | (2006.01) |
| *B62K 23/02* | (2006.01) |
| *B62M 1/16* | (2006.01) |
| *B62M 1/12* | (2006.01) |
| *B62K 3/00* | (2006.01) |
| *B62K 21/16* | (2006.01) |

(52) U.S. Cl.
CPC ............... *B62K 23/02* (2013.01); *B62K 3/00* (2013.01); *B62K 21/16* (2013.01); *B62M 1/12* (2013.01); *B62M 1/16* (2013.01)

(58) Field of Classification Search
CPC ............................................ B62M 1/14
USPC ................... 280/240, 242.1, 243, 244, 246
See application file for complete search history.

(56) References Cited

U.S. PATENT DOCUMENTS

| | | | | |
|---|---|---|---|---|
| 2,547,600 A * | 4/1951 | Saxer | ............. | B62M 1/14 280/234 |
| 4,619,462 A * | 10/1986 | Shaffer | ............. | A61G 5/02 188/24.11 |
| 4,798,395 A * | 1/1989 | Shaffer | ............. | A61G 5/023 280/240 |
| 5,429,379 A * | 7/1995 | Grigoriev | ............. | B62K 25/08 280/212 |
| 5,501,648 A * | 3/1996 | Grigoriev | ............. | B62M 1/12 482/57 |
| 5,542,689 A * | 8/1996 | Chalfant | ............. | B62M 1/12 280/233 |

(Continued)

FOREIGN PATENT DOCUMENTS

KR   10-1990-0009381   *   4/1990

*Primary Examiner* — Joseph Rocca
*Assistant Examiner* — Conan Duda
(74) *Attorney, Agent, or Firm* — Park & Associates IP Law, P.C.

(57) ABSTRACT

The present invention relates to a bicycle having a front wheel driving means. The bicycle having the front wheel driving means according to the present invention includes a frame, a front wheel, a rear wheel, a steering part, and a chain part, wherein opposite sides of the front wheel are provided with respective recoilers having respective one-way clutches therein, and the steering part is provided with a driving means for pulling a wire connected to each of the recoilers.

3 Claims, 2 Drawing Sheets

(56) References Cited

U.S. PATENT DOCUMENTS

| | | | | |
|---|---|---|---|---|
| 7,753,388 | B2* | 7/2010 | Tolhurst | B62K 3/005 |
| | | | | 280/276 |
| 8,403,349 | B2* | 3/2013 | Pi | B62M 1/12 |
| | | | | 280/234 |
| 9,315,230 | B2* | 4/2016 | Price | B62M 1/12 |
| 2004/0150185 | A1* | 8/2004 | Gonsalves | B62M 1/16 |
| | | | | 280/234 |
| 2007/0001423 | A1* | 1/2007 | Murnen | B62H 1/10 |
| | | | | 280/217 |
| 2007/0152421 | A1* | 7/2007 | Pena | B62M 1/16 |
| | | | | 280/232 |
| 2007/0227277 | A1* | 10/2007 | Monno | B62M 1/12 |
| | | | | 74/89 |
| 2009/0091099 | A1* | 4/2009 | Pastilha | B62M 1/14 |
| | | | | 280/253 |
| 2010/0090440 | A1* | 4/2010 | Reichstetter | B62M 1/10 |
| | | | | 280/293 |
| 2011/0215549 | A1* | 9/2011 | Plainfield | B23P 11/00 |
| | | | | 280/270 |
| 2012/0055720 | A1* | 3/2012 | Juan | B60K 6/00 |
| | | | | 180/54.2 |
| 2012/0326413 | A1* | 12/2012 | Miglorancia | B62M 1/12 |
| | | | | 280/234 |
| 2014/0015218 | A1* | 1/2014 | Poor | B62M 1/12 |
| | | | | 280/234 |
| 2014/0125032 | A1* | 5/2014 | Haan | B62M 1/12 |
| | | | | 280/233 |

* cited by examiner

BICYCLE HAVING FRONT WHEEL DRIVING MEANS

REFERENCE TO RELATED APPLICATIONS

This is a continuation of pending International Patent Application PCT/KR2014/005387 filed on Jun. 19, 2014, which designates the United States and claims priority of Korean Patent Application No. 10-2013-0100926 filed on Aug. 26, 2013, the entire contents of which are incorporated herein by reference.

FIELD OF THE INVENTION

The present invention relates generally to a bicycle and, more particularly, to a bicycle having a front wheel driving means enabling easy steering and efficiently transmitting driving force to a front wheel as well as a rear wheel.

BACKGROUND OF THE INVENTION

In general, a conventional bicycle has a rear wheel drive system that turns a rear wheel by using a chain connected to a crankset, more specifically, when a user pedals in order to turn the crankset using his or her legs, the chain connected to the crankset rotates, thereby rotating the rear wheel, thus propelling the bicycle.

However, the conventional bicycle is problematic in that the conventional bicycle is operated only using the rear wheel drive system, thereby the bicycle is driven only by user's leg power, thus when going up a sloping hill or having a heavy load on the bicycle, it is difficult to propel the bicycle efficiently. The conventional bicycle is also problematic in that when using the bicycle for the purpose of exercising, only the user's lower body is used to rotate the crankset by pushing pedals attached thereto, and thus the user's arms and upper body are not exercised.

As documents of a related art, Korean Utility Model Registration No. 20-0418333 and Korean Patent No. 10-0776575 disclose devices to improve the rear wheel drive system.

However, each of the conventional rear wheel drive systems disclosed in the Korean utility model and Korean Patent is problematic in that it is difficult to generate front wheel driving force while steering a bicycle because the conventional rear wheel drive system employs a method of moving a steering part from side to side or pulling the steering part in order to steer the bicycle and drive a front wheel, simultaneously.

SUMMARY OF THE INVENTION

Accordingly, the present invention has been made keeping in mind the above problems occurring in the related art, and the present invention is intended to propose a bicycle having a front wheel driving means enabling a user to efficiently steer the bicycle and to efficiently transmit driving force to a front wheel, simultaneously.

A bicycle having a front wheel driving means according to the present invention, includes: a frame, a front wheel, a rear wheel, a steering part, and a chain part, wherein opposite sides of the front wheel are provided with respective recoilers having respective one-way clutches therein, and the steering part is provided with a driving means for pulling a wire connected to each of the recoilers.

Herein, the driving means includes: a steering body provided with a differential gear in a center thereof; stems connected to opposite sides of the steering body, wherein an end of each of the stems is connected to the differential gear; and a protrusion provided on each of the stems, the protrusion being coupled to an end of an associated one of the wires connected to the respective recoilers.

Further, each of the stems includes: an elbow support provided on the stem for allowing a user to seat an elbow thereon; and a handlebar perpendicularly provided on an end of the stem.

Lastly, the handlebar is coupled to a guide element perpendicularly protruding from an outside end of the stem such that a height of the handlebar can be adjusted.

The bicycle having the front wheel driving means according to the present invention is advantageous in that it is possible to go up a hill with ease using the front wheel driving means.

Further, another advantage of the bicycle resides in that the bicycle provided with the front wheel driving means having a recoiler can be easily steered using elbow supports.

DETAILED DESCRIPTION OF THE INVENTION

Reference will now be made in greater detail to an exemplary embodiment of the present invention with reference to the accompanying drawings.

Figure 1:
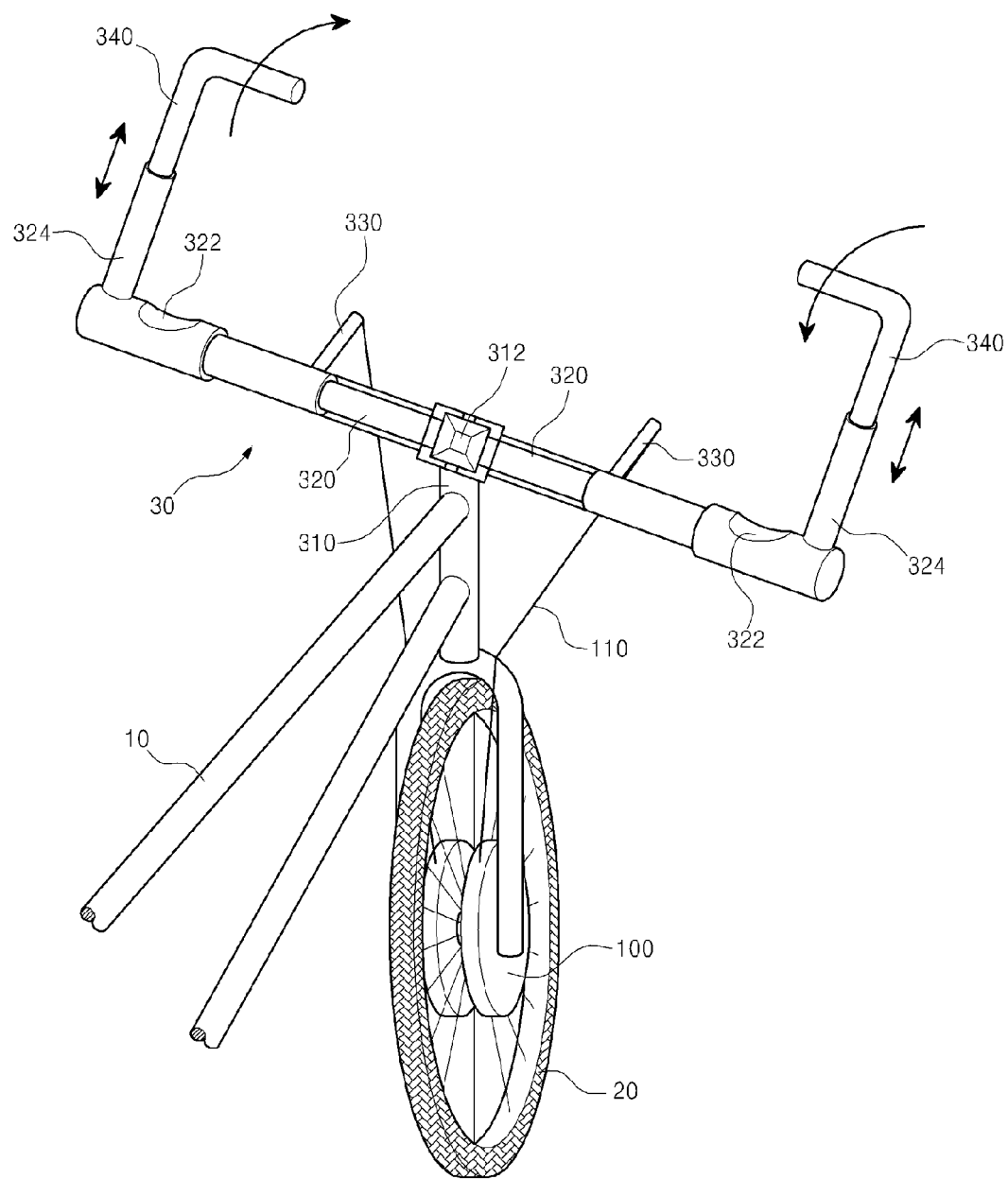
FIG. 1 is a perspective view showing a bicycle having a front wheel driving means according to an embodiment of the present invention.

FIG. 1 is a perspective view showing a bicycle having a front wheel driving means according to the embodiment of the present invention.

As shown in FIG. 1, the bicycle having a front wheel driving means according to the present invention is configured such that: opposite sides of the front wheel 20 are provided with respective recoilers 100 having respective one-way clutches therein; and the steering part is provided with a driving means for pulling a wire 110 connected to each of the recoilers 100.

The driving means turns the recoiler 100 by pulling the wire 110 and transmits a driving force to the front wheel 20, wherein the recoiler 100 is configured to rotate in one direction, owing to a one-way clutch retained in the recoiler 100. When the driving force is transmitted to the front wheel 20, the recoiler 100 rotates the preset direction and returns to the original position by a spring that is installed therein.

The recoiler is an applied device for driving a front wheel by pulling a wire member, and has a mechanism similar to an engine saw starting recoil.

The driving means is configured such that a steering body 310 having a differential gear 312 therein is coupled to a frame 10, wherein opposite sides of the steering body 310 is coupled to respective stems 320.

The stems 320 are coupled to bevel gears that are provided on opposite sides of the differential gear 312, respectively, wherein the bevel gears are connected to each other via a pair of bevel gears that cross each other at right angles. A detailed description of the differential gear will be omitted.

Further, each stem 320 is provided with a protrusion 330 for coupling with an end of the wire 110 that is connected to the recoiler 100.

Thus, when the stems 320 are rotated, the wires 110 connected to the corresponding protrusions 330 are pulled, thereby providing torque to the respective recoilers 100.

Further, each of the stems 320 is provided with an elbow support 322 for allowing a user to place an elbow thereon, and a handlebar 340 is perpendicularly provided on each end of the stem 320.

Firstly, the elbow support 322 performs an elbow support function for preventing the steering part from shaking in a process where a user turns the stems 320 by using the handlebars 340. Thus, the elbow support 322 may be made of a soft material so as to protect user's elbow during use.

Further, the handlebar 340 is coupled to a guide element 324 that protrudes perpendicularly from an outside end of the stem 320 such that a height of the handlebar 340 can be adjusted.

When the front wheel driving means is not in use, the bicycle is used with the handlebar 340 being inserted in the guide element 324. On the contrary, when the front wheel driving means is in use, the bicycle is used with the handlebar 340 extending from the guide element 324 and being locked to each other (not shown but an additional locking means is needed) in order to provide greater torque to the stems 320.

Herein, the stems 320 are coupled to each other via the differential gear so as to be turned in a forward and backward direction, respectively. When the right stem is turned in a backward direction, the wire is pulled, rotating the right recoiler, whereby the front wheel is turned. Here, the left stem is turned in a forward direction, allowing the wire to go back to an original position thereof.

Further, when the left stem is turned in a backward direction, the left recoiler rotates by the wire, whereby the front wheel is turned. Here, the right stem is turned in a forward direction, allowing the wire to go back to an original position thereof.

Reference will be made in greater detail to use of the present invention.

Figure 2:
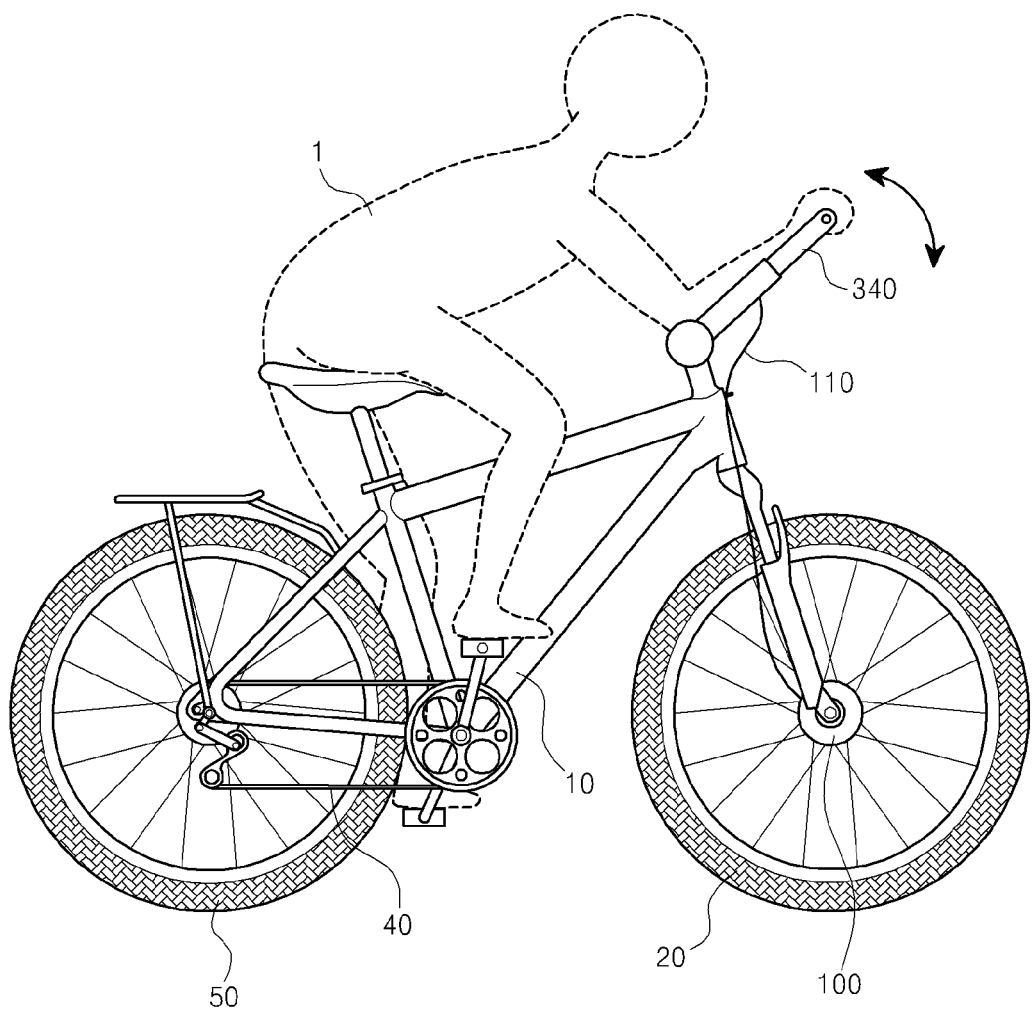
FIG. 2 is a view showing use of the bicycle having the front wheel driving means according to the embodiment of the present invention.

FIG. 2 is a view showing use of the bicycle having a front wheel driving means according to the embodiment of the present invention.

As shown in FIG. 2, the bicycle according to the present invention, like a conventional bicycle, includes a frame 10, a front wheel 20, a rear wheel 50, a steering part, and a chain part 40.

Firstly, a user rides the bicycle with both hands thereof gripping the handlebars 340 while elbows thereof are seated on the elbow supports.

When the front wheel driving means is in use, a user turns the stems using right and left hand alternately, whereby torque is transmitted via the recoiler 100 that is mounted to the front wheel.

Here, a user can steer the bicycle by using his/her right and left elbow rather than his/her right and left hand, whereby the bicycle according to the present invention can be used more conveniently than the conventional bicycle having a front wheel driving means.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The present invention relates to a bicycle that is capable of being applied to a bicycle having a front wheel driving means, which enables easy steering and efficiently transmitting driving force to a front wheel as well as a rear wheel.

What is claimed is:

1. A bicycle having a front wheel driving mechanism, the bicycle comprising: a frame with a steering body coupled thereto, a front wheel, a rear wheel, and a chain part,
wherein the front wheel driving mechanism includes a pair of recoilers provided on two opposite sides of the front wheel, a differential gear coupled to an upper end of the steering body, a pair of stems extending laterally in opposite directions from the differential gear, an elbow support coupled to a terminal end of each of the stems, a handlebar coupled to each of the elbow supports, a protrusion extending in a generally perpendicular direction from each of the stems, and a wire member having a first end connected to a distal end of one of the protrusions and a second end operably connected to one of the respective recoilers,
wherein each of the handlebars has a perpendicular portion extending in a generally perpendicular direction from one of the elbow supports and a lateral portion extending in a generally lateral direction from the perpendicular portion, the lateral portion configured to be gripped by a hand of a user,
wherein each of the handlebars is configured to adjust a height of the lateral portion with respect to the stem, and when a user rotates the lateral portion of the handlebar after adjusting its height, the stem and the protrusion extending therefrom are rotated to pull the wire member, and thus transmit a driving force to the respective recoiler via the wire member with adjusted torque by the adjusted height of the lateral portion.

2. The bicycle of claim 1, wherein each of the elbow supports include a grooved portion configured to place an elbow of the user thereon.

3. The bicycle of claim 1, further including a guide element perpendicularly protruding from an outside end of each of the stems, wherein the perpendicular portion of one of the respective handlebars is slidably coupled to one of the respective guide elements and wherein the perpendicular portion of another one of the respective handlebars is slidably coupled to another one of the respective guide elements, so as to adjust the respective height of each of the handlebars.

* * * * *